E. McGRUER, Jr.
HOLLOW BODY.
APPLICATION FILED MAR. 25, 1916.
1,266,696.
Patented May 21, 1918.
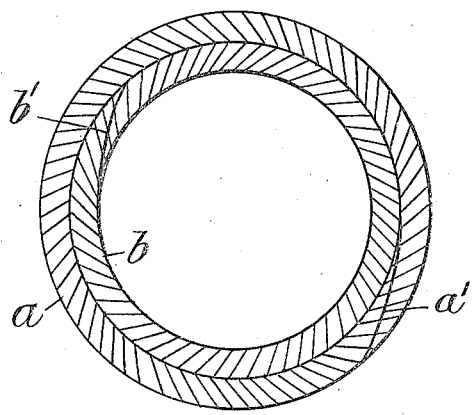
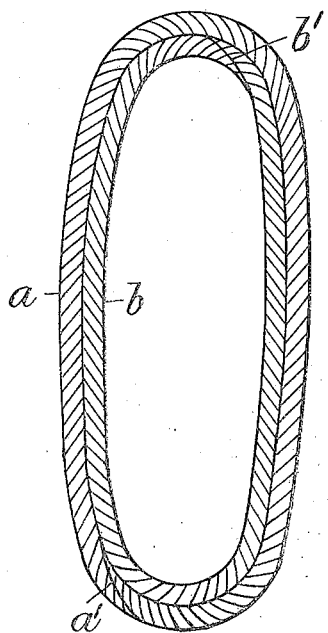
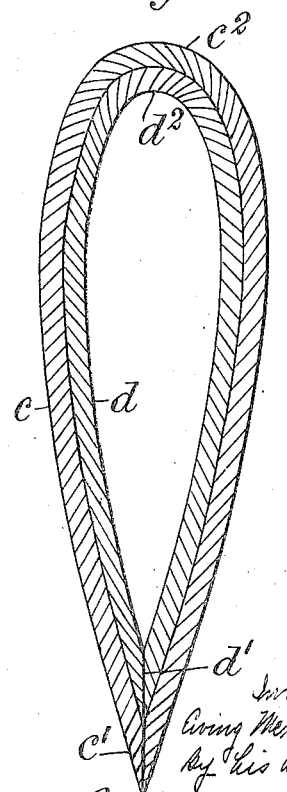

UNITED STATES PATENT OFFICE.

EWING McGRUER, JR., OF BRAESIDE, CLYNDER, SCOTLAND.

HOLLOW BODY.

1,266,696.

Specification of Letters Patent.

Patented May 21, 1918.

Application filed March 25, 1916. Serial No. 86,576.

*To all whom it may concern:*

Be it known that I, EWING McGRUER, Junior, a subject of the King of Great Britain, residing at Braeside, Clynder, Dumbartonshire, Scotland, have invented new and useful Improvements in Hollow Bodies, of which the following is a specification.

This invention relates to improvements in connection with hollow masts, spars, struts, oar shanks and like hollow bodies of wood.

According to this invention a board is quartered-sawed in the direction of the grain and wetted on one side and heated on the other so that the fibers stretch and contract transversely in any ratio up to 40% of their original breadth and so allow the board to be bent on the neutral axis of its transverse section.

The drawings show hollow bodies made in accordance with this invention. Figure 1 is a section of a circular body suitable for a mast, Fig. 2 is a section of an oval body, and Fig. 3 is a section of a body suitable for the struts of aeroplanes.

The hollow bodies shown in Figs. 1 and 2 each consist of two quarter-sawed boards $a$ and $b$ bent into the form shown and provided with lap joints $a^1$ and $b^1$, the edges of the boards being glued or cemented together at the joints, and glued all over the faying surfaces, if desired. It may be pointed out that the end grain or natural annual grain rings of the board $a$ lie toward the opposite hand to that of the board $b$.

The body shown in Fig. 3 similarly is made of two boards $c$ and $d$ provided with lap joints $c^1$ and $d^1$ in a line with one another, the edges and sides of the boards being glued or cemented together at the joints. As before the grain of the board $c$ lies toward the opposite hand to that of the board $d$. Preferably the grain of the boards $c$ and $d$ is at an angle of 45° to the board at the bends $c^2$ and $d^2$. When it is desired that the body be adapted to be used for aeroplane work the body would be made tapered and curved.

The boards before being bent are wetted on one side and heated at the other as above described. One method is to place a board on a steam heated mandrel of the shape required and at the same time to apply water to the other side of the board. In this manner the fibers are contracted on the heated side and stretched on the wetted side.

It is desired that care be taken that no destruction of the fibrous cells of the wood takes place.

What I claim is:—

1. A hollow wooden body having the grain of the wood extending longitudinally thereof, consisting of a plurality of boards bent and fitted one within the other, the natural grain rings of one board lying right-hand, and the natural grain rings of the adjacent board lying left-hand.

2. A hollow wooden body consisting of two or more quarter-sawed boards bent and fitted one within the other, the end grain of one board lying right-hand, and the end grain of the adjacent board lying left-hand.

3. A hollow strut for aeroplanes and the like, comprising a quarter-sawed board having its edges cut at an angle and bent to form a curved edge adjacent the central line of the board and an acute angle between the sides adjacent the meeting edges.

4. A hollow strut for aeroplanes and the like, comprising a plurality of quarter-sawed boards having their edges cut at an angle and each bent to form a curved edge adjacent the central line thereof and an acute angle between the sides adjacent the meeting edges, fitted one within the other.

5. A hollow strut for aeroplanes and the like, comprising a plurality of quarter-sawed boards having their edges cut at an angle and each bent to form a curved edge adjacent the central line of the board and an acute angle between the sides adjacent the meeting edges, fitted one within the other with the end grain of one of the boards extending in the opposite direction to that of the adjacent boards.

6. The process of forming a hollow body, which consists in producing a quarter-sawed board having the end grain extending at an angle of substantially 45 degrees to the sides of the board, bending the same to cause the edges to abut, and securing the abutting edges.

7. The process of forming a hollow body, which consists in producing a plurality of quarter-sawed boards each having the end grain extending at an angle of substantially 45 degrees to the sides thereof, bending the same to cause the edges to abut, securing the abutting edges, and then fitting the boards one within the other.

8. The process of forming a hollow body, which consists in producing a plurality of quarter-sawed boards each having the end grain extending at an angle of substantially 45 degrees to the sides thereof, bending the same to cause the edges to abut, securing the abutting edges, and then fitting the boards one within the other with the end grain of one board extending in the opposite direction to that in the adjacent board.

9. The process of forming a hollow body, which consists in producing a plurality of quarter-sawed boards each having the end grain extending at an angle of substantially 45 degrees to the sides thereof, bending the same to cause the edges to abut, securing the abutting edges, and then fitting the boards one within the other with the end grain of one board extending in the opposite direction to that in the adjacent board, the joint formed by the abutting edges of one board being circumferentially displaced relatively to that in the adjacent boards.

10. The process of forming a hollow body, which consists in producing a plurality of quarter-sawed boards each having the end grain extending at an angle of substantially 45 degrees to the sides thereof, bending the same to cause the edges to abut, securing the abutting edges, and then fitting the boards one within the other with the end grain of one board extending in the opposite direction to that in the adjacent board, whereby a line extending radially from the longitudinal axis of the body intersects a plurality of natural grain rings.

EWING McGRUER, Jr.